April 23, 1968  G. WILKE  3,379,706
π-ALLYL METAL COMPOUNDS AND THEIR USE
AS POLYMERIZATION, INCLUDING
OLIGOMERIZATION, CATALYSTS
Filed Aug. 6, 1964
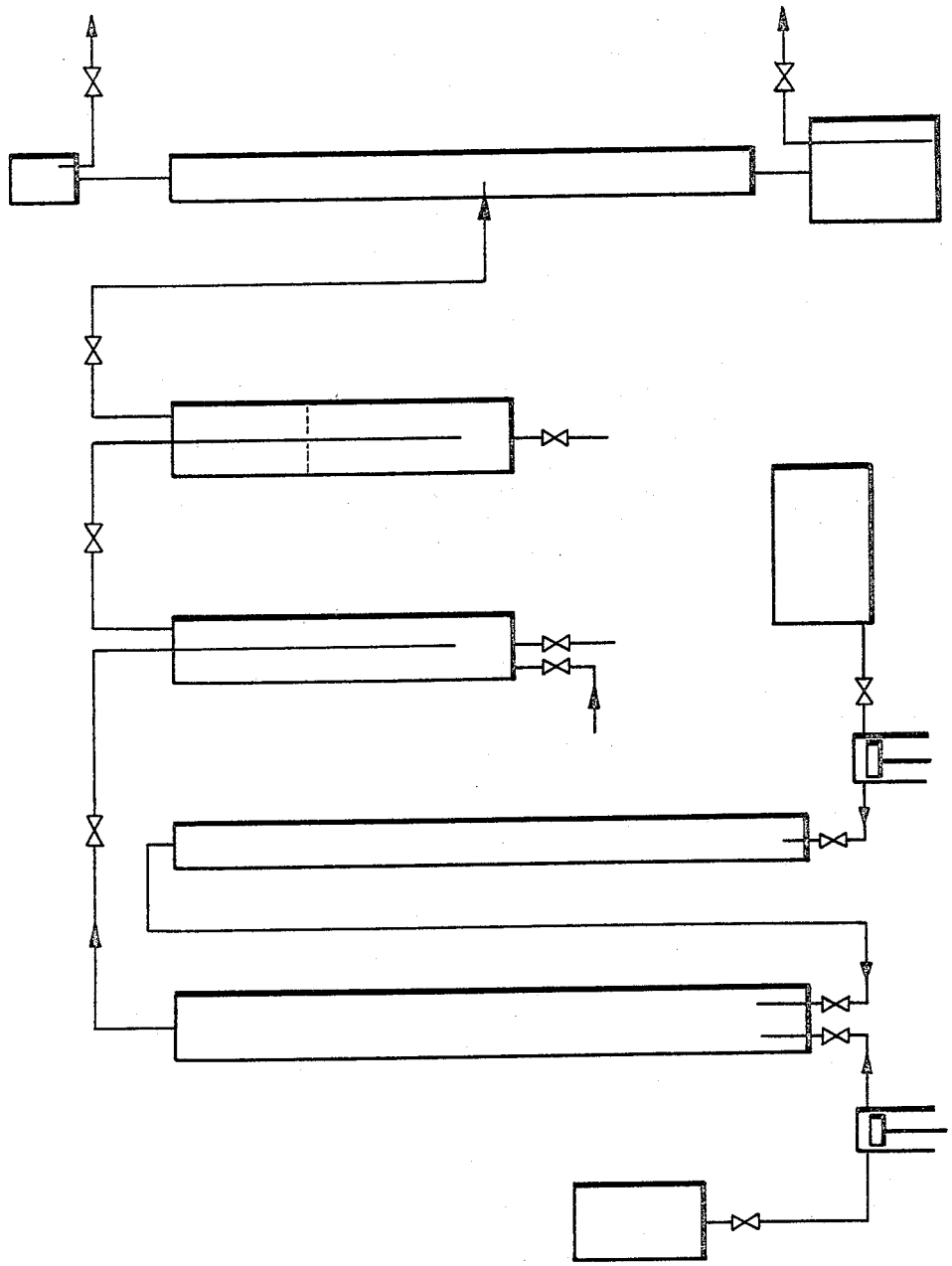
INVENTOR

United States Patent Office 3,379,706
Patented Apr. 23, 1968

3,379,706
π-ALLYL METAL COMPOUNDS AND THEIR USE AS POLYMERIZATION, INCLUDING OLIGOMERIZATION, CATALYSTS
Günther Wilke, Mulheim (Ruhr), Germany, assignor to Studiengesellschaft m.b.H., Mulheim (Ruhr), Germany
Continuation-in-part of application Ser. No. 272,881, Apr. 15, 1963. This application Aug. 6, 1964, Ser. No. 387,826
Claims priority, application Germany, Aug. 10, 1963, St 20,976
31 Claims. (Cl. 260—943)

ABSTRACT OF THE DISCLOSURE

Polymerization and co-polymerization of mono- and diolefins using as the catalyst a π-allyl compound of a transition metal of groups IV to VIII, both inclusive, of the Periodic Table. Specifically, ethylene and propylene are polymerized. Preferred catalysts are substituted π-allyl nickel, π-allyl cobalt and complexes of π-allyl transition metal compounds with Lewis acids and/or electron donors.

---

This invention relates to new and useful improvements in π-allyl metal compounds and their use as polymerization, including oligomerization, catalysts.

One object of the invention comprises the polymerization, including open chain dimerization, of mono- and diolefins with new types of catalysts which are in many respects superior to previously known catalysts for such polymerization.

Another object of the invention comprises the new polymerization catalysts.

The foregoing and still further objects of the invention will be apparent from the following description.

The catalysts usable in accordance with the invention are π-allyl metal compounds for which the effective grouping is

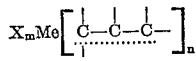

in which Me is a transition metal of the IVth to VIIIth and preferably of the IVth and VIIIth side groups of the periodic system, in which $m$ is from zero to integers of 1–3, in which $n$ is an integer of 1–4, in which $m+n$ is an interger not exceeding 4, and in which X is an anionic radical, preferably halogen. Several such compounds, including any with and without the X radical, may be present.

Compounds in which X in the above grouping is 1 are represented by the general Formula I:

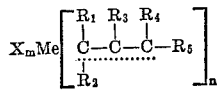      I in which Me signifies a transition metal of the sub-groups to groups IV to VIII of the Periodic System, X an anionic radical, $m$ and $n$ whole numbers of 1–3, with $m+n$ being 2–4 and $R_1$ to $R_5$, which may be similar to different, a member of the group consisting of hydrogen, alkyl, cycloalkyl, aralkyl or aryl, wherein the radicals $R_1$ or $R_2$ or $R_3$ and $R_4$ or $R_5$ may also be bound into an olefinic unsaturated ring system, with at least 3 and preferably 5–12 ring members. It is characteristic for the compounds of Formula I, that the transition metals are bound to a π-allyl-system or π-allyl systems, and in the simplest case to the π-allyl group as such or their hydrocarbon-, i.e. alkyl, aryl or aralkyl and their cyclic derivatives. As π-allyl-system is defined a grouping of 3 C-atoms, which as bound as a substantially planar system to a central atom in substantially the same manner by way of all 3 C-atoms.

In the simplest case of the bis-π-allyl-nickel with an empirical Formula II $(C_3H_5)_2$ Ni this type of bond is represented as follows:

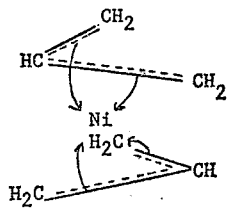

The roentgenographic structural analysis of the corresponding methyl derivative, the bis-π-methallyl nickel, has shown that a "sandwich" type compound is involved in which the two methallyl groups are bound to the nickel atom as planar systems in such manner that the $CH_3$ groups go into the trans-position:

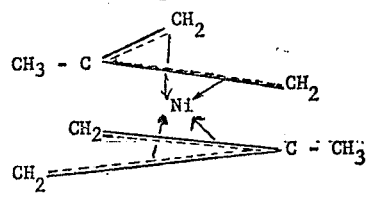

In the compounds of types I or II below, one each such planar π-allyl system is bound to a metal atom.

The metals occur in these compounds in different formal valences, and accordingly 1 to 4 of such π-allyl-systems are bound to the particular transition metal. Likewise the possibility exists that 2 of such π-allyl-systems are connected with one another via the substituents $R_1–R_5$, so that an open-chain system exists, which is bound to the transition metal via 2 π-allyl-groups.

The compounds of Formula I may be made simply by reacting (such as by contacting) the compounds of Formula II below with an acid $H^+X^-$, preferably in substantially anhydrous form, in which X represents the desired anionic radical, such as a halogen other than fluorine, as more fully set forth in my co-pending application Ser. No. 387,990 filed Aug. 6, 1964 corresponding to my German application Ser. No. 20,974 filed in Germany about Aug. 10, 1963. Certain Ni halides of Formula I may be also advantageously made by my co-pending application Ser. No. 388,000 filed Aug. 6, 1964 corresponding to my German application Ser. No. 20,975 filed Aug. 10, 1963. They are obtained in the form of their dimers by reacting an olefinic Ni hydrocarbon with an allyl halide.

Compounds in which X in the above grouping is O are represented by the general Formula II:

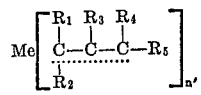      II in which $n'$ is an integer of 1–4 and $R_1–R_5$ are as above given, and may, for example, be produced from the transition metal halide, such as nickel bromide, in a Grignard reaction with an allyl (or substituted allyl-magnesium chloride, as more fully set forth in my co-pending application, Ser. No. 272,881 corresponding to German patent application St. 19,116 IVb/12o.

The π-allyl-system represents a special kind of linkage which exerts sterically, as well as electronically, a specific influence on the transition metal, to which it is bound.

Now it was found that these π-allylmetal-systems of the general Formulae I and II represent highly effective catalysts for the oligomerization or polymerization of olefins, which, dependent upon the selection of the catalyst components, are able to release extremely selective reactions. There may be subjected to the catalysis in accordance with the invention mono-olefins, such as ethylene, propylene, butenes, pentenes, hexenes, etc., or their mixtures, or diolefins, such as butadiene or isoprene, or their mixtures. Depending upon catalysts and additives, polymerization may be carried out to high-molecular products, such as polyethylene, polypropylene or polybutadienes, wherein the polymerization in the latter case may be so directed that either 1,2- or 1,4-polybutadienes are obtained, whereby the latter may show exclusively or almost exclusively the 1,4-cis structure. On the other hand, the polymerization may extend only to a few molecules. Thus there may be produced from ethylene almost pure butene-2 or mixtures of butenes, hexenes and octenes. Likewise, it is possible to come from propylene to products, which preponderantly consist of hexenes, though containing in one case as the principal product 2-methylpentene and in the other 2,3-dimethyl-butene. Finally, butadiene may be oligomerized to chain-compounds, for example 3-methyl-heptatriene-(1,4,6).

It was found furthermore, that in many cases the activity of the catalysts may be increased to a multiple, if the $\pi$-allylmetal-systems are combined with one or more Lewis acids, for example compounds $R_2AlX$, $RAlX_2$ and particularly $AlX_3$, wherein X is halogen and preferably Cl, Br or I and R the same or dissimilar=alkyl-, cycloalkyl-, aralkyl- and aryl-groups.

It was found, furthermore, that the selectivity of the catalysts may be influenced through addition of compounds which are able to act as electron-donors, i.e., as Lewis bases. Such electron-donors are, for example, alkyl-, cycloalkyl-, aralkyl- or aryl-compounds of the elements of Main Group V of the Periodic System, except nitrogen, tri-alkyl, -cycloalkyl-, -aralkyl- or -aryl-esters of the elements of Main Group V except nitrogen, as well as their triamides, as well as dialkylsulfoxides.

The said activity- and selectivity-increase through addition of Lewis acids and/or Lewis bases is mainly observed in compounds of the type $\pi$-allyl-Me-X.

The process in accordance with the invention is, first of all, explained on the basis of some examples, in which pure $\pi$-allyl-compounds of transition metals are brought to reaction with mono-olefins or respectively 1,3-diolefins:

Tris-$\pi$-allylcobalt reacts at temperatures below $+10°$ C. at normal pressure, or slightly higher, with butadiene, whereby there is substantially uniformly obtained in a yield of 92.5% the trans-3-methylheptatriene-(1,4,6). Tris-$\pi$-allylchromium polymerizes butadiene to high-molecular polybutadiene, which preferably shows 1,2-structure. Ethylene is polymerized at temperatures of 0–100° and pressures of 1–100 atmospheres by tris-$\pi$-allylchromium to high-molecular linear polyethylene. All catalysts named in these examples are thus characterized, that they contain transition metals bound to $\pi$-allyl-systems.

In accordance with the invention, compounds of the type $\pi$-allyl-Me-X, and preferably $\pi$-allyl-metalhalides, may be used as catalysts. Thus, butadiene may be polymerized very smoothly to pure 1,4-cis-polybutadiene, with the aid of bis-$\pi$-allyl-cobalt-iodide at temperatures of $-60$ to $+50°$.

The catalytic effectiveness of the compounds of the type $\pi$-allyl-Me-X may furthermore be considerably increased in accordance with the invention, if compounds are added, which are to be defined as Lewis acids. Accordingly, for example, the polymerization speed and stereospecifity strongly increases in the conversion of butadiene with bis-$\pi$-allyl-cobalt-iodide, if equimolecular quantities of for example aluminumbromide are added to the bis-$\pi$-allyl-cobalt-iodide. With equally good success may also be used for the activation of the catalyst diethyl-aluminum-chloride or ethylaluminum-dichloride or their mixture such as in the form of ethyl aluminum sesquichloride.

This effect appears particularly clearly in the oligomerization of olefins, such as for example ethylene or propylene, with the aid of $\pi$-allylnickel-catalysts. While for example $\pi$-allylnickelbromide reacts with ethylene or propylene at increased temperatures and under pressure in the course of hours, the catalytic activity of the system may be so strongly increased through the addition of for example equimolecular quantities of aluminumbromide or alkylaluminum-halides, that the oligomerization reaction at normal pressure already proceeds at temperatures around $-80°$ or preferably from $-50$ to $+20°$ with very high speeds. Thus ethylene may be, for example, converted with the aid of a catalyst containing $\pi$-allylnickelbromide and aluminumbromide in the mol ratio of 1:1 or 1:2, at $-20°$ with high speed (6–700 g. ethylene/1 g. Ni/hr.) into a mixture of butenes hexenes, octenes and higher oligomers. The selectivity of the catalyst is low, therefore a mixture of oligomers is obtained. Similarly this was observed in the oligomerization of propylene with such a catalyst system.

Furthermore it was found that very selectively acting catalysts on the basis of $\pi$-allyl-compounds, of for example nickel, may be secured, if to the combination of a $\pi$-allylnickelhalide with a Lewis acid there is added a Lewis base according to the above given definition. Thus, for example, a completely selectively acting catalyst is formed, which converts for example ethylene practically exclusively into butene-(2), if to an equimolecular mixture of $\pi$-allylnickeliodide and aluminumbromide there is added an equivalent of triphenylphosphine. At temperatures of $-40$ to $-20°$ and normal pressure, ethylene is converted by this catalyst with high speed (4500 g. ethylene/1 g. Ni/hr.) and yields of 91% into butene-(2). The formation of higher oligomers is practically suppressed. On the basis of this example, it is possible to explain the strong influence of the compounds acting as electron-donors on the selectivitiy of the $\pi$-allylmetal-catalysts. However, the action of such electron-donors also appears in the specificity of the catalysts, which is demonstrated through the following example:

$\pi$-Allylnickeliodide in ether was first reacted with an equivalent if triphenylphosphine. This gave, in crystallized form, the 1:1-addition-product $(\pi\text{-}(C_3H)NiI.P(C_6H_5)_3)$. This was dissolved in chlorobenzene and treated with 1 equivalent of aluminumbromide. Propylene was introduced into the red-brown catalyst solution at $-40$ to $0°$ and normal pressure. With a reaction speed of 4600 g. propylene/1 g. Ni/hour, in yields of 93.5%, a mixture of principally 2 hexenes was obtained, namely, about 20% n-hexene and 75% 2-methyl-pentene, which were formed according to the following formulation:

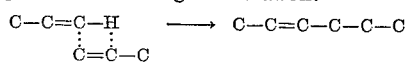

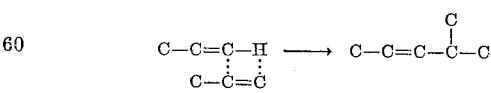

working under completely analogous reaction conditions, using however instead of triphenylphosphine, tricyclohexylphosphine, then with about the same reaction speed and yield a mixture was obtained of 31% 2-methylpentene and 67% 2,3-dimethylbutene:

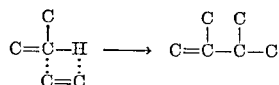

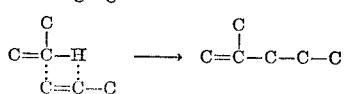

While in the first case a terminal CH-bond of the one propylene-molecule was added on the C=C-double-bond of the second propylene-molecule, there occurred in the second case, under the influence of the tricyclohexylphosphine, an addition of the middle CH-bond of the one propylene-molecule onto the C=C-double-bond of the second propylene-molecule, which means that, with the aid of the addition of a particlular electron-donor, it is possible to extensively guide the course of reaction at the $\pi$-allyl-metal-catalyst.

The catalytic reactions in accordance with the invention may be carried out in solvents inert with respect to the catalysts. As solvents are used, for example, aliphatic or aromatic ethers, cyclic ethers, saturated hydrocarbons or halogenated aliphatic or aromatic hydrocarbons and other aromatic or halogenated aromatic solvents. If necessary, one may also work without solvents. The oligomerization- or polymerization-reactions in accordance with the invention are carried out in the temperature range of $-80°$ to $+100°$ and at pressures up to 100 atmospheres.

The products producible according to the process of the invention possess great technical (industrial) significance. 1,4-cis-polybutadiene is an important technical (industrial) rubber and, by splitting off the methane from the dimers of propylene the same may be converted to isoprene. The polyethylene or polypropylene obtainable in accordance with the invention is a linear product resulting totally halogen-free.

All operations must be carried out under exclusion of air and humidity, i.e., under protective gas, such as for example argon or nitrogen, since the catalysts used in accordance with the invention are sensitive to air and humidity.

Example 1

0.6 g.=3.4 mmol tris-$\pi$-allylchromium are dissolved in 300 cm.$^3$ hexane and brought to reaction with ethylene in a 0.5 l. stainless steel autoclave under shaking at 50 atmospheres and 20°. After 5 hours the excess ethylene is blown-off the reaction product percipitated, the catalyst destroyed with methanol/hydrochloric acid and the polyethylene formed drawn off by suction. The polymer is washed neutrally and dried at $10^{-4}$ torr and 80°. Obtained are 5 g. of a linear polyethylene, the IR-spectrum of which is identical with the spectra of the so-called Ziegler polyethylenes. The median molecular weight M amounts to $1.88 \times 10^6$.

Example 2

One proceeds according to Example 1, however, one works at a reaction temperature of 43°. After 5 hours, there are obtained 32 g. linear polyethylene.

Example 3

0.6 g. bis-$\pi$-allylchromiumiodide are brought to reaction with ethylene, as in Example 1, in 300 cm.$^3$ hexane at 50 atmospheres and 55–58°. In the course of 24 hours 40 g. linear polyethylene are formed.

Example 4

0.63 g.=3.6 mmol tris-$\pi$-allylchromium are placed in a 250 cm.$^3$ flask equipped with thermometer, low temperature-reflux-cooler and magnetic stirrer. Subsequently 87 g.=1.6 mol butadiene are condensed into the same. At the boiling temperature of the butadiene no reaction is observed. 50 cm.$^3$ benzene are added, whereby the boiling temperature rises to 15°. Through external cooling, the mixture is kept at 15°. After 10 hours, the entire butadiene is converted. The polymer is dissolved by heating in benzene and subsequently precipitated with acetone, under addition of small quantities of antioxidant(s) (phenyl-B-naphthylamine). The polybutadiene is drawn off by suction and dried at $10^{-4}$ torr. According to IR-analysis, the polymer mainly consists of 1,2-polybutadiene. It is merely rendered impure through slight quantities of cis- or trans-1,4-polybutadiene.

Example 5

0.4 g.=1.18 mmol bis-$\pi$-allylchromiumchloride are dissolved in 100 cm.$^3$ chlorobenzene and treated with 0.7 cm.$^3$=6 mmol melted aluminumbromide. Into the solution ethylene is introduced at 20° and normal pressure. After 3 hours, the catalyst is decomposed through addition of 3 cm.$^3$ butanol. The polyethylene formed is precipitated with acetone and subsequently drawn off by suction. Catalyst residues are removed through washing with a methanol/hydrochloric acid mixture. The product is filtered and neutrally washed. The polymer is dried at $10^{-4}$ torr. Yield 2.6 g. linear polyethylene.

Example 6

4.3 g.=23.6 mmol tris-$\pi$-allylcobalt are dissolved in 50 cm.$^3$ pentane at $-40°$. Subsequently, into the solution is condensed 400 g. butadiene. In the course of 2.5 days one permits the mixture to come to 20°. All volatile products are then distilled off in vacuum, and the distillate subsequently analyzed gaschromatographically. In all 182.7 g. butadiene were converted. The reaction product consists of 168 g.=92.5% trans-3-methyl-heptatriene-(1,4,6), 0.5 g.=0.27% vinylcyclohexene, 0.5 g.=0.27% cyclooctadiene-(1,5) and 13.7 g.=7.5% of a trimer of the butadiene of unknown structure.

Example 7

In accordance with my co-pending application Ser. No. 388,000 filed Aug. 6, 1964 (German application Ser. No. 20,975), 2.38 g.=13.1 mmol tris-$\pi$-allylcobalt are reacted in 120 cm.$^3$ ether at $-60°$ with a solution of 1.66 g.= 0.655 mmol iodine in 100 cm.$^3$ ether.

There are condensed 40–50 g. butadiene into this solution. The mixture is permitted to come to room temperature in the course of 12 hours. The mixture then remains standing at room temperature for 2 days. Subsequently, unreacted butadiene and the solvent are removed. There are removed by distillation from the viscous residue, small quantities of trimers or tetramers of the butadiene. The residue is then washed with methanol and subsequently dried at $10^{-4}$ torr 30–40 g. of a highly viscous polymer are obtained, which, according to IR analysis, mainly consists of 1,4-cis-polybutadiene.

Example 8

0.234 g.=0.87 mmol bis-$\pi$-allylcobaltiodide in 20 cm.$^3$ toluene are treated at $-80°$ with 0.2 cm.$^3$=1.906 mmol ethylaluminumdichloride in 100 cm.$^3$ toluene. Into the solution formed are condensed 60 g. butadiene and then the mixture is heated to $-30°$. Within a few minutes a violent reaction sets in. The mixture is kept through cooling at $-20$ to $-30°$. The polymer formed is precipitated with methanol, filtered off and dried in high-vacuum. The yield amounts to 40 g. According to IR-analysis, the polymer consists of practically pure 1,4-cis-polybutadiene, which is merely rendered impure through traces of 1,3-trans- or respectively 1,2-polybutadiene.

Example 9

0.136=0.504 mmol bis-$\pi$-allylcobaltiodide in 20 cm.$^3$ toluene are treated at $-80°$ with a solution of 0.135 g=0.504 mmol aluminumbromide in 100 cm.$^3$ toluene. Into the mixture are condensed 50–60 g. butadiene and the mixture is then kept under stirring between $-45$ and 0°. After 2–6 hours the reaction is broken off, the catalyst is destroyed with methanol, and the polymer is precipitated. The polymer is separated and washed and dried at $10^{-4}$ torr and 50°. Obtained are 33 g. of a rubber which, according to IR-analysis, represents practically pure cis-1,4-polybutadiene, which only contains very slight quantities of trans-1,4- or respectively 1,2-polybutadiene.

Example 10

0.158 g.=0.895 mmol bis-π-allylcobaltchloride in 50 cm.³ toluene are treated with a solution of 0.895 mmol diethylaluminumchloride in toluene. Into the mixture are condensed at —80° 40–50 g. butadiene. One heats to —20 to +20°, whereby the polymerization occurs. The polymer is worked up as usual. Obtained is a mixture of cis- and trans-1,4- and 1,2-polybutadiene.

Example 11

0.158 g.=0.895 mmol bis-π-allylcobaltchloride in 50 cm.³ toluene are treated with a solution of 0.895 mmol ethylaluminumdichloride. With the solution obtained, butadiene is polymerized at —20°. The reaction proceeds very rapidly. Obtained is a very pure 1,4-cis-polybutadiene.

Example 12

To 200 g. liquid butadiene is added at —80° a solution of 0.358 g.=2.025 mmol bis-π-allylcobaltchloride in 50 cm.³ toluene, and then the solution is treated with 2.025 mmol ethylaluminumdichloride in 10 cm.³ toluene. The reaction mixture is permitted to slowly thaw overnight up to room temperature, then 3 l. benzene are added and the polymer is brought in solution through heating. Subsequently the polybutadiene is precipitated with methanol, separated and dried at $10^{-4}$ torr. Obtained are 103 g. rubber-like polybutadiene, which, according to IR-analysis, consists of practically pure 1,4-cis-polybutadiene, which contains only very little 1,4-trans-polybutadiene.

Example 13

0.2135 g.=0.243 mmol of the addition-product of 2 molecules triphenylphosphine on 1 molecule π-allylcobaltdiiodide, $(CO(C_3H_5)I_2—2P(C_6H_5)_3)$, are dissolved at —80° in 70 cm.³ chlorobenzene and treated with 0.892 mmol aluminumbromide. Into the solution are condensed 40–50 g. butadiene. One heats to —30 to —20°, whereby the polymerization sets in. The reaction product is worked up in the usual manner, and obtained are 25 g. of a polybutadiene, which consists of trans-1,4- and 1,2-polybutadiene.

Example 14

0.8 g.=4.02 mmol π-cyclooctatrienyl - nickelchloride are dissolved hot in 50 cm.³ benzene and brought to reaction in the autoclave at 70–75° with 26 g. ethylene. After 24 hours, the reaction is broken off. The gaseous reaction products are blown off on a gasometer and subsequently analyzed gaschromatographically. The liquid residue is distilled-off and the distillate again analyzed gaschromatographically. The following experimental balance results: The conversion amounts to about 80%. The reaction product consists of a mixture of n-butenes (80%), hexenes (18%), octenes (1.9%) and traces of decenes. The quantity of non-volatile residue corresponds to the catalyst quantity used.

Example 15

0.5 g.=2.46 mmol π - cyclooctenylnickelchloride are dissolved in the heat in 50 cm.³ benzene and converted in the autoclave with 57 g. ethylene. The mixture is kept for 24 hours at maximally 39°. In a conversion of 30%, 93% butenes and 7% hexenes were formed.

Example 16

0.8 g.=3.94 mmol π-cyclooctenyl-nickelchloride are suspended in 50 cm.³ benzene and converted in the autoclave during 2 days at maximally 90° with 50 g. propylene. In a conversion of 40% are obtained 72.5% hexenes and 37.5% higher not distillable oligomers.

Example 17

0.34 g.=1.5 mmol π-allylnickeliodide are dissolved in 100 cm.³ methylenechloride absolutely free from air and treated at —80° with 0.32 cm.³=3.0 mmol ethylaluminumdichloride. Obtained is a clear red solution, into which is introduced at —40° under vigorous stirring pure ethylene, freed from air, through washing with ethoxy-diethylaluminum. The ethylene is very rapidly absorbed by the solution and the reaction mixture must be strongly cooled. After 8 hours the reaction is broken off and the catalyst decomposed through adsorption of air. The solvent and the reaction products are distilled off at 0.5 torr into a receiver cooled to —80°. Subsequently the distillate is distilled on a low-temperature-column. Obtained are in all 430 g. oligomerizate, consisting to about 40% of butene-(2), about 40% of hexenes, as well as 15% octenes and about 5% higher oligomers.

Example 18

0.242 g.=1.06 mmol π-allylnickeliodide are treated at —40° in 50 cm.³ methylenechloride with 0.23 cm.³=2.12 mmol ethylaluminumdichloride. Obtained is a clear red solution into which propylene is introduced at temperatures of —40 to —50° under vigorous stirring for 1.75 hours. Then one permits to stand for further 5 hours at —40 to —50°. Subsequently the catalyst is decomposed through adsorption of air. The filtrate is filtered and distilled. Obtained are 140 g. oligomerizate, which consists of 65% hexenes, 24% nonenes and 11% higher oligomers.

Example 19

3.75 g. π-allylnickeliodide are converted in 100 cm.³ ether at —80° with 4.33 g. triphenylphosphin (mol ratio 1:1). One heats briefly to 20° and then filters off the complex resulting in the form of red-brown crystals $(C_3H_5NiI \cdot a(C_6H_5)_3)$.

Yield: 5.7 g.=70% of the theory.

Calculated: Ni 12.0%. Found 12.1%.

1.851 g.=3.78 mmol of this complex are treated in 200 cm.³ chlorobenzene at —40° with 0.8 cm.³=7.6 mmol ethylaluminumdichloride. Into the clear red solution propylene is introduced under vigorous stirring at —15 to —20°. The reaction proceeds under strong development of heat, so that the cooling bath must have about —50 to —80°. As soon as the reaction speed decreases, the dimerizate is sucked-off in two cooling- traps, connected behind one another, of —80 or respectively —180°. Into the solution remaining behind propylene is again introduced under the same conditions. In all, four times for 30 minutes each propylene is introduced. At the end of the fourth time the dimerizate as well as the solvent and the higher oligomers are quantitatively distilled off. The distillates are combined and distilled at a column. In all are obtained 3015 g. oligomerizate, consisting to 95.3% of hexenes, 4.7% of higher oligomers. According to the gaschromatographic analysis the $C_6$-fraction consists of 75% 2-methylpentenes, 21% n-hexenes and 4% 2,3-dimethylbutenes.

Accordingly, 6.25 kg. propylene/1 g. Ni/hr. were converted.

Example 20

2.076 g.=4.24 mmol of the 1:1 adduct produced according to Example 19 are converted in 200 cm.³ chlorobenzene at —40° with 2.5 g.=9 mmol aluminumbromide. According to the process described in Example 19, in all 7 times each for 40–45 minutes propylene is introduced. Obtained are 5792 g. reaction product, consisting to 93.5% of hexenes and 6.5% higher oligomers. The $C_6$-fraction contains according to gaschromatographic analysis 72% 2-methylpentenes, 19% n-hexenes and 6% 2,3-dimethylbutenes.

Accordingly, 4.6 kg. propylene/1 g. Ni/hr. were converted.

Example 21

4.2 g. π-allylnickeliodide are converted according to Example 19, however with 5.17 g. tricyclohexylphosphin. Obtained is likewise a red-brown crystallizate, which corresponds to the composition $(C_3H_5NiI—P(C_6H_{11})_3)$.

Calculated: Ni, 11.55%. Found: Ni, 11.35%.

2.215 g.=4.36 mmol of this complex are converted in 200 cm.³ chlorobenzene at −40° with 0.92 cm.³=8.7 mol ethylaluminumdichloride. According to the process described in Example 22, into the red solution propylene is introduced 8 times for 35–40 minutes each. After the third or respectively seventh distilling-off 100 cm.³ each chlorobenzene are added. In all are obtained 4711 g. reaction product, consisting to 87% of hexenes and 13% higher oligomers. The C₆-fraction contains according to gaschromatographic analysis 67% 2,3-dimethylbutenes, 31% 2-methylpentenes and traces of n-hexene.

Converted were 4.1 kg. propylene/1 g. Ni/hr.

Example 22

3.38 g., π-allylnickeliodide are converted according to Example 19, however with 8 g. tris-(o-oxydiphenyl)-phosphite. Obtained is a red-brown crystallizate of the composition C₃H₅NiI.α(OC₆H₄C₆H₅)₃.

Calculated: Ni, 7.70%. Found, Ni, 7.55%.

3.064 g.=4.00 mmol of this complex are treated in 200 cm.³ chlorobenzene at −40° with 0.84 cm.³=8 mmol ethylaluminumdichloride. Into the solution propylene is introduced during 25 minutes at 0 to +10°. Subsequently all volatile products are distilled-off, which are fractionated on a packed column. Obtained are 800 g. reaction product, which consists to 94.7% of hexenes and 5.3% higher oligomers. The C₆-fraction contains, according to gaschromatographic analysis, 75% 2-methylpentenes, 20% n-hexenes and 4.5% 2,3-dimethylbutenes.

8.2 kg. propylene/1 g. Ni/hr. were converted.

Example 23

0.364 g.=0.75 mmol of the addition product produced, according to Example 19, from π-allylnickeliodide and triphenylphosphin are treated in 100 cm.³ methylenechloride at −80° with 0.16 cm.³=1.5 mmol ethylaluminumdichloride. Ethylene is introduced during 3 hours at −40 to −50°, and then the reaction product is drawn off by suction into the −80 or respectively −180° cooling traps. The condensate is fractionated on a low-temperature column. Obtained are 587 g. reaction product consisting to 91% of butene-(2), about 8% hexenes as well as 1% higher oligomers.

4.5 kg. ethylene/1 g. Ni/hr. were converted.

Example 24

1.92 g.=10 mmol vanadium tetrachloride were treated in 150 ml. ether at −80° with a saturated ethereal solution of allylmagnesium-chloride (44 mmol) under stirring. After concentration of the very dark colored solution at 10⁻⁴ torr until dryness, the residue was absorbed in pentane, the halogen-free pentane-extract filled into an autoclave cooled to −80°, and 30 g. pure propylene pressed-on. The reaction mixture was allowed to thaw slowly, and for the completion of the reaction was heated for three hours at 70°. The excess propylene was blown off and high-molecular propylene isolated in the usual manner.

Yield: 5 g.

Example 25

0.546 g. π-pinenyl-nickel bromide are dissolved together with 0.56 g. tricyclohexylphosphin at 20° C. in 50 cc. of chlorbenzene. This solution is admixed with 2 cc. of a 1 M solution of aluminum bromide in chlorbenzene (0.533 g. AlBr₃). After the addition of a further 100 cc. of chlorbenzene, the solution is cooled to −15 to −20° C. and propylene is thereafter passed into the same at this temperature with strong cooling and vigorous stirring for 35 minutes. Thereafter the reaction is interrupted by the addition of 5 cc. of cyclooctadiene-(1,5). All volatile components are removed by distillation at 10⁻² torr.

There are obtained as reaction products 330 g. of a C₆-olefin mixture of the following composition:

| | Percent |
|---|---|
| 2,3-dimethyl-butene-(1) | 60 |
| 2-methyl-pentene(1) | 20 |
| 4-methyl-pentene-(2) | 13 | as well as about 2% of n-hexene.

Example 26

0.832 g.=2.45 mmol of the 1:1:1 addition product of triisopropylphosphin, aluminum bromide and π-allyl nickel bromide are dissolved in 100 cc. of chlorbenzene and cooled to −10 to −15° C. Propylene is then passed thereinto with vigorous stirring and strong cooling for a period of 2 hours and 15 minutes. Thereafter all volatile products are removed by distillation in vacuo. There are obtained 602 g. of a reaction product which is composed of 87.5% of C₆-olefins and of 12.5% of C₉ or C₁₂-olefins. The C₆-olefins are composed of 1.8% n-hexenes, 37.1% 2-methylpentenes, 58.8% 2,3-dimethylbutenes.

Example 27

0.529 g.=2.3 mmol π-allylnickeliodide, 0.63 cc.=2.3 mmol phosphoric acid tridiethylamide and 0.49 cc.=4.6 mmol ethylaluminumdichloride are dissolved in 100 cc. of chlorbenzol and there is then passed in for 25 minutes at −30 to −35° C. propylene with vigorous stirring. The reaction product is then worked up in accordance with Example 26 and there are obtained 202 g. reaction product with 93.5% C₆-olefins and 6.5% higher olefins. The C₆-olefins are composed as follows: 5.5% n-hexenes, 51.4% 2-methylpentenes, 43% 2,3-dimethylbutenes.

Example 28

0.576 g.=2.54 mmol π-allyl-nickeliodide, 0.898 g. =2.54 mmol tri-o-cresyl-phosphite and 0.53 cc.=5 mmol ethylaluminumdichloride are dissolved in 150 chlorbenzol and are reacted for one hour with propylene at −5° C. The mixture is permitted to stand thereafter for 12 hours at 20° C. and is then worked up in accordance with Example 26. There are thus obtained 507 g. C₆-olefins of the following composition:

| | Percent |
|---|---|
| n-Hexenes | 22.5 |
| 2-methyl-pentenes | 75 |
| 2,3-dimethylbutenes | 2.5 |

Higher olefins were found only in traces.

Example 29

0.423 g.=1.42 mmol of the addition product of 1-triethylphosphin to 1 π-allyl-nickel bromide in 80 cc. chlorbenzene are reacted with 0.379 g.=1.42 mmol aluminumbromide, whereupon the mixture is treated for 17 minutes with propylene at −10 to −20° C. There is then obtained 385 g. of a reaction product composed to the extent of 93.5% of C₆-olefins and 6.5% of higher olefins. The C₆-olefins are composed as follows:

| | Percent |
|---|---|
| n-Hexenes | 9.2 |
| 2-methyl-pentenes | 70.3 |
| 2,3-dimethylbutenes | 20.4 |

Example 30

1.09 g.=2.04 mmol of the 1:1 addition product of triphenyl arsin to π-allyl-nickeliodide as well as 0.43 cc. =4.1 mmol ethylaluminum dichloride are dissolved in 100 cc. chlorbenzene and are reacted for 40 minutes with propylene at 0° C. There are obtained 64.2 g. C₆-olefins of the following composition:

| | Percent |
|---|---|
| n-Hexenes | 30 |
| 2-methyl-pentenes | 68.5 |
| 2,3-dimethylbutenes | 1.5 |

Higher olefins were only found in traces.

Example 31

Propylene is passed for 50 minutes at −15 to −20° C. into a solution of 0.434 g.=1.75 mmol π-crotyl-nickel-iodide and 0.38 cc.=3.6 mmol ethylaluminumdichloride in 100 cc. chlorbenzene. The reaction product is then worked up in the usual manner and there are obtained 155 g. $C_6$-olefins together with about 1 g. of higher olefins. $C_6$-olefins are composed as follows:

| | Percent |
|---|---|
| Hexenes | 23 |
| 2-methyl-pentenes | 75 |
| 2,3-dimethylpentenes | 2 |

Example 32

Into a solution of 0.467 g.=2 mmol π-cinammyl-nickel-chloride, 0.58 g.=2.2 mmol-diphenylphosphin and 0.47 cc.=4.4 mmol ethylaluminumdichloride in 100 cc. of chlorbenzene, there is passed propylene at −10 to 0° C. After the reaction of 550 g. propylene, the reaction is interrupted and the reaction product is worked up in the usual manner. There are obtained 502 g. $C_6$-olefins as well as 39.5 g. higher olefins. The $C_6$-olefins have the following composition:

| | Percent |
|---|---|
| n-Hexenes | 21 |
| 2-methyl-pentenes | 75 |
| 2,3-dimethylbutenes | 4 |

Example 33

0.6 g.=1.48 mmol 1,2,3-triphenyl-π-cyclopropenyl-nickelbromide are dissolved in 60 cc. of chlorbenzene and are admixed at −20° C. with 0.4 g.=1.48 mmol aluminum bromide. Propylene is passed into the solution for 1 hour at −20 to −30° C. Thereupon the reaction product is worked up in the usual manner, and there are obtained 84 g. of a reaction product which is composed to the extent of 93% of $C_6$-olefins. The $C_6$-olefins have the following composition:

| | Percent |
|---|---|
| n-Hexenes | 20.7 |
| Methyl-pentenes | 76.9 |
| 2,3-dimethylbutenes | 2.4 |

Example 34

0.17 g.=0.93 mmol π-allyl-palladium chloride were dissolved in 50 cc. of chlorbenzene together with 0.24 g.=1.86 mmol ethylaluminumdichloride. This mixture is brought to reaction with 30 g. of propylene in an autoclave for 15 hours at 80° C. Thereafter the unreacted propylene is blown off and the reaction product is worked up. There are obtained 5 g. of higher olefins in addition to 7 g. of $C_6$-olefins.

Example 35

0.54 g. π-pinenyl nickel bromide, 0.56 g. tricyclohexylphosphin as well as 0.533 g. aluminum bromide are dissolved in 150 cc. of chlorbenzene. Into this solution there are passed at −15 to −20° C. ethylene for 1 hour with vigorous stirring. Thereafter the reaction is interrupted by the addition of 5 cc. of cyclo-octadiene-(1,5) and the reaction product is worked up. There are obtained 300 g. butene which is composed of 22% butene-(1), 42.2% trans-butene-(2), and 35.8% of cis-butene-(2) as well as 85 g. of $C_6$-olefins which are composed of 80% 3-methyl-pentenes and 20% n-hexenes.

Example 36

0.8 g.=5.9 mmol π-allyl nickel chloride and 0.76 g.=6.2 mmol ethylaluminum dichloride are dissolved in 100 cc. methylene chloride and reacted with ethylene for four hours at −50° C. The reaction product is then worked up and there are obtained 53 g. butene which is composed to the extent of 0.3% of butene-(1), 86.5% trans-butene-(2), and 13.2% cis-butene-(2) as well as of 25 g. $C_6$ or $C_8$ olefins and 16 g. higher products.

Example 37

0.36 g. π-allylnickel bromide, 0.56 g. tricyclohexylphosphin as well as 0.53 g. aluminum bromide are dissolved in 50 cc. of chlorbenzene. This solution is reacted with a mixture of 146 g. butene-(2) and 100 cc. chlorbenzene at −20° C. Propylene is slowly passed into this mixture for 12 hours under vigorous stirring. Thereafter the reaction is interrupted by the addition of 5 cc. cyclo-octadiene-(1,5) and the reaction product is worked up. In addition to an unreacted propylene and butene, there are obtained 55.6 g. $C_6$-olefins which are principally composed of 2,3-dimethylbutene and 2 methylpentene as well as 48.9 g. $C_7$-olefins which are principally of the structure of 2,3-dimethylpentene.

Example 38

0.558 g.=2.46 mmol π-allyl nickel iodide, 0.648 g.=2.47 mmol triphenylphosphin and 0.52 cc.=4.94 mmol ethyl aluminumdichloride are dissolved in 100 cc. methylene chloride. There are passed into this solution in the course of 3½ hours at −30° C., 480 g. of a mixture of 69 mol percent ethylene and 31 mol percent propylene. After working up, there are obtained 244 g. of a reaction product of the following composition:

| | | Percent |
|---|---|---|
| Butene | 70 g.= | 28.7 |
| $C_5$-olefins | 137 g.= | 57.1 |
| $C_6$-olefins | 24.5 g.= | 10.1 | as well as 12.4 g.=5.1% higher olefins.

Example 39

3.27 g. of the 1:1:1 adduct of tricyclohexylphosphine, aluminum bromide and π-allylnickel bromide are dissolved in 2 cc. chlorbenzene and thereafter admixed with 200 g. butene-(2). Ethylene is passed into this mixture during 1½ hours at −15° C. In addition to unreacted butene and ethylene there are obtained 101 g. of a reaction product which contains up to 76% $C_6$-olefins and up to 24% higher olefins. The $C_6$-olefins are composed to the extent of 88.7% of 3-methyl-pentenes and to the extent of 10.3% of n-hexenes.

EXAMPLE 40

0.8 g.=4.45 mmol π-allyl nickel bromide are dissolved in 225 cc. brombenzene together with 1.19 g. aluminumbromide and there is then added 170 g. cyclohexene. Ethylene is passed into this mixture at −10 to −15° C. for 3 hours. The reaction product is worked up in the usual manner and there is obtained on distillation on a 50 cm. rotary band column the following fractions:

| B.P., ° C.: | G. |
|---|---|
| 82–118 | 5.3 |
| 118–121.5 | 3.5 |
| 121.5–134 | 9.7 |
| 134–141 | 21.9 |

The fraction with a B.P. of 134–141° C. consists in accordance with the mass spectrum and the I.R. spectrum of a mixture of 1-ethyl-cyclohexene and ethylidene cyclohexane. Upon catalytic hydration this product yields practically pure ethyl-cyclohexane.

EXAMPLE 41

0.25 g.=1 mmol tetra-π-allyl-zirconium are dissolved in 100 cc. liquid butadiene and then heated in a closed pressure tube for 24 hours to 90° C. In addition to unreacted butadiene, there are obtained 5 g. of distillable components which contain about 80% n-octatriene-(1,3,6). The remainder of the reacted butadiene (40 g.) consists of polybutadiene.

EXAMPLE 42

0.05 g.=0.3 mmol tris-π-allyl vanadium are dissolved at −80° C. in 30 cc. toluene. The solution is saturated with butadiene and thereafter heated in a closed pressure tube for 8 hours to 80° C. There may be separated from the reaction product 5 g. polybutadiene.

EXAMPLE 43

1.1 g.=8 mmol π-allyl nickel chloride are reacted in 100 cc. toluene with 0.85 cc.=8 mmol ethylaluminum dichloride. Two liquid layers are formed. Butadienes distilled into this solution at −30° C. and the mixture is permitted to stand for 24 hours at −30 to 0° C. Thereafter all volatile components are distilled off in high vacuum. The residue is then taken up in benzene and the benzene solution is washed with 2 N hydrochloric acid, and thereafter with water. The dried benzene solution is diluted with acetone, whereby the polybutadiene precipitates, which is then separated and dried. In accordance with the I.R. spectrum the same is principally 1,4-cis-polybutadiene.

EXAMPLE 44

0.95 g.=7.0 mmol π-allyl nickel chloride are admixed in 100 cc. toluene with 0.74 cc.=7.0 mmol ethylaluminum dichloride. There is added to this mixture 100 cc. isoprene at −80° C. whereupon the temperature is permitted to rise to 20° C.

For the completion of the reaciton, the mixture is refluxed for a short time, whereupon all volatile components are removed by distillation in high vacuum. The residue is taken up in benzene, is washed with 2 N hydrochloric acid and water, and then dried. The solution is admixed with acetone whereby the polyisoprene is precipitated. The same is then collected and dried. In accordance with the I.R. spectrum, the same is predominantly composed of 1,4-cis-polyisoprene in admixture with small quantities of 3,4-polyisoprene.

EXAMPLE 45

0.655 g.=1.93 mmol of the 1:1 adduct of triisopropylphosphine on π-allyl nickel bromide and 0.515 g.=1.93 mmol aluminum bromide are dissolved in 100 cc. of chlorbenzene and admixed with 100 g. butene-(2). The mixture remains for 18 hours at 0° C. and is then worked up. There are obtained 60 g.=96.7% $C_8$-olefins as well as 2 g.=3.3% higher olefins. The $C_8$-olefins are composed of 1.6% n-octenes, 26.3% 3,4-dimethylhexenes, 72.1% 3-methyl-heptenes.

EXAMPLE 46

4.16 cc. of a darkly red colored solution which contains 2.0 mmol of the π-allyl compounds of nickel of the formula $C_{12}H_{19}NiCl$ bound to aluminum chloride are dissolved in 100 cc. chlorbenzene. There is passed thereinto propylene for 17 minutes at −10 to −20° C. There are obtained 258 g. of a reaction product, principally consisting of $C_6$-olefines.

EXAMPLE 47

10 cc. of a darkly red colored solution containing 2.0 mg.-atom of the π-allyl compound of nickel of the formula $C_{12}H_{19}NiCl$ bound to aluminum chloride are diluted with 100 cc. of chlorbenzene. There are passed thereinto at −15 to −20° C. with vigorous stirring, propylene for 1 hour. After termination of the reaction, the catalyst is destroyed by the addition of a few cc. of ammonia solution with simultaneous shaking of the mixture with air. There are obtained 1080 g. of a reaction product which is composed, to the extent of 88% of $C_6$-olefins, and to the extent of 12% of $C_6$-, $C_9$-, $C_{12}$- and higher olefins. The $C_6$-olefins have the following composition:

| | Percent |
|---|---|
| 2-methyl pentenes | 78 |
| n-Hexenes | 21 |
| 2,3-dimethyl butene | 1 |

EXAMPLE 48

10 cc. of a catalyst solution prepared in accordance with Example 47 which contain 2 mg. atom nickel are diluted with 100 cc. of chlorbenzene and with 2 mmol triphenylphosphine. There is passed thereinto propylene for 1 hour at −15 to −20° C. The catalyst is decomposed in accordance with Example 47 and there are obtained 948 g. of a reaction product which is composed to 96% of $C_6$- and to 4% of higher olefins. The $C_6$-olefins have the following composition:

| | Percent |
|---|---|
| 2-methyl pentenes | 75 |
| n-Hexenes | 20 |
| 2,3 dimethyl butene | 5 |

Example 49

10 cc. of the catalyst solution prepared in accordance with Example 47 and containing 2 mg. atom nickel are diluted with 100 cc. chlorbenzene and admixed with 2 mmol trimethylphosphite. There is then passed into the same propylene for 45 minutes at −15 to −20° C. There are obtained 54.7 g. of a reaction product, principally consisting of $C_6$-olefins.

Example 50

10 cc. of the catalyst solution prepared in accordance with Example 47 and containing 2 mg. atom nickel are dissolved in 100 cc. chlorbenzene and are then admixed with 0.047 g.=2 mmol tri-m-butylphosphine. There are then passed into the same propylene at −15 to −20° C. for 1 hour. The catalyst is thereupon decomposed in accordance with Example 2. There are then obtained 752.8 g. of a reaction product consisting to the extent of 95.4% of $C_6$ and to the extent of 4.6% of higher olefins. The $C_6$ olefins have the following composition:

| | Percent |
|---|---|
| 2-methylpentenes | 69.7 |
| n-Hexenes | 7.1 |
| 2,3-dimethylbutene | 23.1 |

Example 51

7.8 cc. of a darkly red colored catalyst solution of the π-allyl compound of the nickel of the formula $C_{12}H_{19}NiCl$ bound to aluminum chloride and containing 2 mg. atom nickel are diluted with 100 cc. of α-chlornaphthalene. There is passed into the same propylene for 1 hour at −15 to −20° C. Thereafter the catalyst is decomposed in accordance with Example 47 and there are obtained 539 g. of a reaction product consisting to the extent of 86% of $C_6$ olefins and to the extent of 14% of higher olefins.

Example 52

In an experimental arrangement in accordance with the diagrammatic representation 1 the dimerization of propylene is carried out in a continuous manner. Liquid propylene is injected with an injector pump by way of a drying tower filled with silica gel into a reactor provided with a cooling system and having a free space of about 20 liters. There is simultaneously injected into the reactor, with a second pump, catalyst. The catalyst used is 5500 cc. of a 0.2 molar darkly red colored solution of the π-allyl compound of the nickel $C_{12}H_{19}NiCl$ bound to aluminum chloride in chlorbenzene, and the solution is injected, together with 89.4 kg. of propylene, into the reactor in the course of 7 hours, by way of the two pumps. By adjusting the release valve between the reactor and the washing tower, there is maintained within the reactor a liquid pressure of 15 atmospheres. The temperature is maintained by an intensive circulatory cooling in the lower part of the reactor at from 10 to 15° C., and in the upper part of the reactor at −4 to −10° C. The "sole" temperature is −12° C. Under these conditions, 1.1 mg. atom nickel are reacted in the catalyst per 1.28 kg. propylene per hour. Product and unreacted propylene are taken off from the head, are depressurized from 15 atmospheres to 5 atmospheres, and are then freed from the catalyst in a wash tower with the aid of an ammoniacal solution and small amounts of air. In a subsequent settling vessel, any solid products which may have been taken over, as well as the lost portions of ammoniacal solution, are washed out with pressure water. Product and propylene are taken away from the head of the settling tank and are separated thereafter in a distillation column. The yield per time unit is 98.1%, i.e., in the course of 7 hours 87.73 kg. product and 1.67 kg. unreacted propylene are removed from the distillation column (the reaction system was already filled with product at the beginning, which was left over from the first reaction run).

The reaction product consists of, to the extent of 88.5% of $C_6$ olefins, and to the extent of 11.5% of $C_9$ or $C_{12}$ olefins.

The properties activity and reactivity of the $\pi$-allyl metal compounds herein described are solely due to the $\pi$-allyl linkage and the particular stereo positioning of atoms thereby defined. Thus their effective grouping which is controlling for said properties, activity and reactivity is

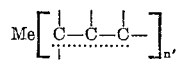

or

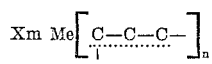

in which Me is a transition metal of the IVth to VIIIth, and preferably of the IVth to VIth and the VIIIth side groups of the periodic system, especially Zr, V, Cr, Ni, Co, Pd and Pt, and in which $X^-$ is an aniodic acid radical and preferably halogen, $n'$ is an integer of 1–4, $m$ and $n$ each designating an integer of 1–3, with $m+n$ being 2–4. For this reason any particular substituent or substituents are generally not material in either the conversion of the $\pi$ Me allyl to its "salt" compound or to their catalytic or other properties or reactivities. This is well illustrated by the fact that small and long chain aliphatic substituents, cyclic substituents, including those of the bulky pinenyl and various aromatic substituents, all as shown by the at-times highly substituted examples, do not affect the basic properties of these $\pi$ Me allyls.

The present application is a continuation-in-part of my earlier filed application Ser. No. 272,881, filed Apr. 15, 1963.

I claim:

1. Method for the homo-polymerization or copolymerization of mono- or di-olefinic hydrocarbons which comprises contacting at least one such hydrocarbon with a $\pi$-allyl compound of a transition metal of the side groups of the IVth to VIIIth groups of the periodic system.

2. Method in accordance with claim 31 in which said hydrocarbon is a monoolefinic hydrocarbon and in which said transition metal is one of the side groups of the IVth to VIth and VIIIth groups of the periodic system.

3. Method in accordance with claim 2 in which said transition metal is a member of the group consisting of titanium, zirconium, vanadium, chromium, molybdenum, tungsten, nickel, iron, cobalt, palladium and platinum.

4. Method according to claim 3, in which the $\pi$-allyl compound has at least once the effective grouping

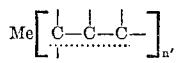

in which $n'$ is an integer from 1 to 4, and which Me is said transition metal.

5. Method according to claim 4 in which said olefin is one not exceeding $C_3$.

6. Method according to claim 3 in which said $\pi$-allyl compound is one having an anionic radical linked thereto.

7. Method according to claim 6 in which said anionic radical is an acid radical.

8. Method according to claim 7 in which said acid radical is a halogen other than fluorine.

9. Method according to claim 7 in which said olefin is one not exceeding $C_3$.

10. Method according to claim 9 in which said acid radical is a halogen other than fluorine.

11. Method according to claim 3 in which said $\pi$-allyl compound is a $\pi$-allyl nickel halide dimer.

12. Method according to claim 11 in which said monoolefin is one not exceeding $C_3$.

13. Method according to claim 1 in which said hydrocarbon is contacted with said $\pi$-allyl compound in combination with at least one member consisting of the groups of Lewis acids and electron donors and in which said transition metal is one of the side groups of the IVth to VIth and VIIIth groups of the periodic system.

14. Method according to claim 13 in which said transition metal is a member of the group consisting of titanium, zirconium, vanadium, chromium, molybdenum, tungsten, nickel, iron, cobalt, palladium and platinum.

15. Method according to claim 14 in which the $\pi$-allyl compound has at least once the effective grouping

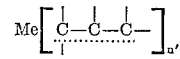

in which $n'$ is an integer from 1 to 4, and in which Me is said transition metal.

16. Method according to claim 15 in which said olefin is one not exceeding $C_3$.

17. Method according to claim 14 in which said $\pi$-allyl compound is one having an acid radical linked thereto.

18. Method according to claim 17 in which said acid radical is a halogen other than fluorine.

19. Method according to claim 18 in which said olefin is one not exceeding $C_3$.

20. Method according to claim 17 in which said $\pi$-allyl compound is a $\pi$-allyl nickel halide dimer.

21. Method according to claim 20 in which said olefin is one not exceeding $C_3$.

22. Method in accordance with claim 31 in which said hydrocarbon is a diolefin and in which said transition metal is a member of the group consisting of titanium, zirconium, vanadium, chromium, molybdenum, tungsten, nickel, iron, cobalt, palladium and platinum.

23. Method according to claim 22 in which said diolefin is isoprene.

24. Method according to claim 22 in which said $\pi$-allyl compound is one having an acid radical linked thereto.

25. Method according to claim 24, in which said acid radical is a halogen other than fluorine.

26. Method according to claim 25 in which said $\pi$-allyl compound is a $\pi$-allyl nickel halide dimer.

27. Method according to claim 25 in which said hydrocarbon is contacted with said $\pi$-allyl compound in combination with at least one member consisting of the groups of Lewis acids and electron donors and in which said transition metal is one of the side groups of the IVth to VIth and VIIIth groups of the periodic system.

28. Method according to claim 27 in which said $\pi$-allyl compound is a $\pi$-allyl nickel halide dimer.

29. Method according to claim 1 wherein the polymer product has an acyclic hydrocarbon backbone.

30. Method according to claim 1 wherein when said transistion metal is nickel, said $\pi$-allyl compound is selected from the group consisting of ($\pi$-allyl) nickel (anion), bis ($\pi$-substituted allyl) nickel, ($\pi$-allyl) ($\pi$-substituted allyl) nickel, ($\pi$-substituted allyl) nickel (anion), and complexes thereof with at least one member selected from the group consisting of Lewis acids and electron donors.

31. Method according to claim 30 wherein the polymer product has an acylic hydrocarbon backbone.

References Cited

UNITED STATES PATENTS

| | | | |
|---|---|---|---|
| 3,231,549 | 1/1966 | Rose | 260—88.2 |
| 3,234,198 | 2/1966 | Boor et al. | 260—94.6 |
| 3,149,080 | 9/1964 | Gluesenkamp et al. | 252—431 |
| 3,123,571 | 3/1964 | Walker et al. | 252—430 |

JOSEPH L. SCHOFER, *Primary Examiner.*

R. A. GAITHER, *Assistant Examiner.*

UNITED STATES PATENT OFFICE
CERTIFICATE OF CORRECTION

Patent No. 3,379,706                          April 23, 1968

Günther Wilke

It is hereby certified that error appears in the above numbered patent requiring correction and that the said Letters Patent should read as corrected below.

Column 1, line 45, after "IVth" insert -- to VIth --; line 72, "as" should read -- is --. Column 2, line 4, "II" should read -- π --. Column 4, line 47, "-($C_3H$)" should read -- -($C_3H_5$) --. Column 5, line 40, "percipitated" should read -- precipitated --. Column 8, lines 7 and 23, "adsorption", each occurrence, should read -- absorption --. Column 13, line 24, "reaciton" should read -- reaction --. Column 15, line 70, after "and" insert -- in --.

Signed and sealed this 21st day of October 1969.

(SEAL)
Attest:

EDWARD M. FLETCHER, JR.                   WILLIAM E. SCHUYLER, JR.
Attesting Officer                           Commissioner of Patents